United States Patent
Ha

(10) Patent No.: US 6,242,872 B1
(45) Date of Patent: Jun. 5, 2001

(54) PROGRAMMABLE GRADUAL ILLUMINATION LIGHTING DEVICE

(76) Inventor: Nguyen Hu Ha, 514 Ritner St., Philadelphia, PA (US) 19148

( * ) Notice: Subject to any disclaimer, the term of this patent is extended or adjusted under 35 U.S.C. 154(b) by 0 days.

(21) Appl. No.: 09/556,340

(22) Filed: Apr. 24, 2000

(51) Int. Cl.[7] .................................................. G05F 1/00
(52) U.S. Cl. ......................... 315/293; 315/194; 315/58; 315/360; 315/DIG. 4; 313/315
(58) Field of Search .................... 315/293, 194, 315/58, 56, 71, 200 A, 150–159, DIG. 4, 197, 360; 313/315

(56) References Cited

U.S. PATENT DOCUMENTS

| | | | |
|---|---|---|---|
| 3,450,941 | 6/1969 | Butts | 315/194 |
| 3,496,451 | 2/1970 | Duncan | 323/16 |
| 3,573,543 | 4/1971 | Grindstaff | 315/194 |
| 3,781,593 | * 12/1973 | Rodriguez | 315/58 |
| 3,896,334 | 7/1975 | Rodriguez | 315/194 |
| 4,008,416 | * 2/1977 | Nakasone | 315/194 |
| 5,519,263 | * 5/1996 | Santana, Jr. | 307/115 |
| 5,619,081 | * 4/1997 | Gershen et al. | 307/125 |
| 5,731,663 | * 3/1998 | Davis | 315/194 |
| 5,789,869 | 8/1998 | Lo et al. | 315/159 |

* cited by examiner

*Primary Examiner*—Haissa Philogene
*Assistant Examiner*—Tuyet T. Vo
(74) *Attorney, Agent, or Firm*—Henderson & Sturm LLP

(57) ABSTRACT

A programmable gradual illumination device (10) for disposition intermediate a conventional light fixture (100) and a conventional light bulb (200). The device (10) includes a housing member (20) having a threaded base element (21) dimensioned to engage the light fixture (100) and a threaded socket element (22) adapted to receive the base end (201) of the light bulb (200). The housing member (20) is provided with a programmable timer unit (13) and a variable resistance unit (12) which are operatively connected to a control unit (14) which includes a selector switch (50) and circuitry that will allow electrical current to flow directly from the fixture (100) to the bulb (200) from the fixture (100) through the programmable timer unit (13) to the bulb (200) and from the fixture (100) through both the programmable timer unit (13) and the variable resistance unit (12) to the bulb (200) for different lighting conditions.

8 Claims, 2 Drawing Sheets

PROGRAMMABLE GRADUAL ILLUMINATION LIGHTING DEVICE

BACKGROUND OF THE INVENTION

1. Field of the Invention

The present invention relates to the field of rheostat controlled lighting systems in general, and in particular to a programmable lighting device wherein the rheostat control is coupled to a timer mechanism to provide gradual illumination.

2. Description of Related Art

As can be seen by reference to the following U.S. Pat. Nos. 3,450,941; 3,496,451; 3,573,543; 3,896,334; and 5,789,869, the prior art is replete with myriad and diverse rheostat controlled lighting systems.

While all of the aforementioned prior art constructions are more than adequate for the basic purpose and function for which they have been specifically designed, they are uniformly deficient with respect to their failure to provide a simple, efficient, and practical gradual illumination lighting device that is programmable and coupled to a timer so that the increasing illumination levels can be used in lieu of a noisy alarm clock that jars a person awake.

While there are many individuals who have no problem with audible alarm clocks, there are also a significant number of other individuals who would much prefer a quiet, subtle method of being slowly aroused from sleep at the appropriate time.

As a consequence of the foregoing situation, there has existed a longstanding need for a new and improved type of programmable gradual illumination lighting device that can be incorporated into a conventional light fixture to gently, gradually, and silently rouse a person from slumber, and the provision of such a lighting device is a stated objective of the present invention.

BRIEF SUMMARY OF THE INVENTION

Briefly stated, the gradual illumination lighting device that forms the basis of the present invention is designed for use with conventional lighting fixtures and light bulbs and comprises in general, a housing unit having male and female components which are adapted to be connected to the female socket of a conventional light fixture and the male end of a light bulb, respectively. The housing unit also contains a variable resistance unit, a timing unit, and a control unit.

As will be explained in greater detail further on in the specification, the timing unit is operatively connected to the variable resistance unit to gradually supply increased illumination through the conventional light bulb until the maximum illumination is produced at the end of a selected amount of time to simulate sunrise when the light bulb is provided with an optional tinted filter dome.

In addition, the control unit includes a selector switch member that will allow the light bulb to be used in the conventional manner with or without a manual dimming function provided by a rotatable dimming knob, or in a timed on/off fashion similar to a timed burglar prevention system, or as a programmed dimming or gradual illumination system to either help induce sleep or gradually raise the consciousness of the user through timer controlled increased luminosity in the morning as an alternate to jarring audible alarms.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
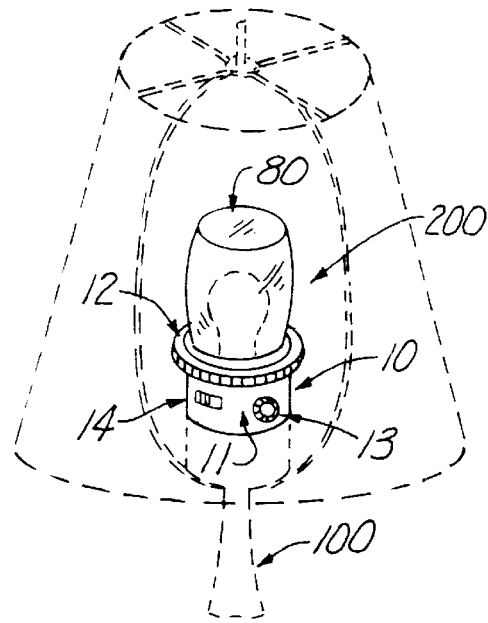
FIG. 1 is a perspective view of the gradual illumination device installed on a conventional lighting fixture.

As can be seen by reference to the drawings, and in particular to FIG. 1, the programmable gradual illumination lighting device that forms the basis of the present invention is designated generally by the reference number 10. The lighting device 10 comprises in general, a housing unit 11 containing a variable resistance unit 12, a timing unit 13, and a control unit 14. These units will now be described in seriatim fashion.

Figure 2:
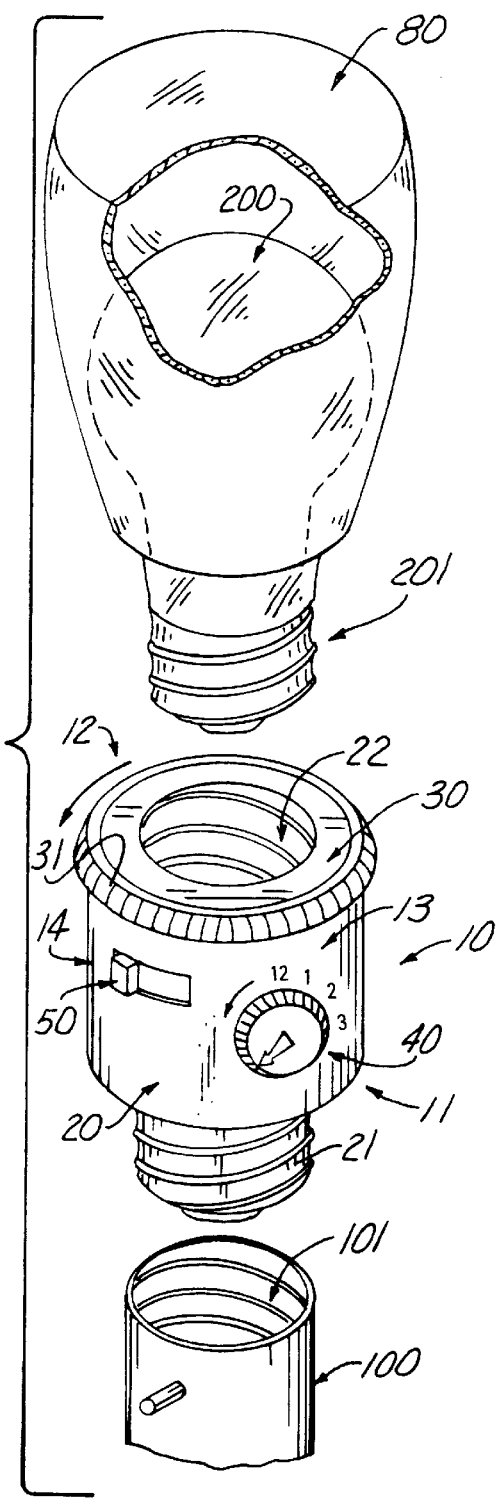
FIG. 2 is an exploded perspective view of the lighting device and components of a conventional lighting fixture.

As shown in FIG. 2, the housing unit 11 comprises a generally cylindrical housing member 20 having a lower externally threaded male base element 21 that is dimensioned to be received in the internally threaded female socket element 101 of a conventional electrical light fixture 100 and having an upper internally threaded female socket element 22 that is dimensioned to receive the male base end 201 of a conventional electrical light bulb 200.

Figure 3:
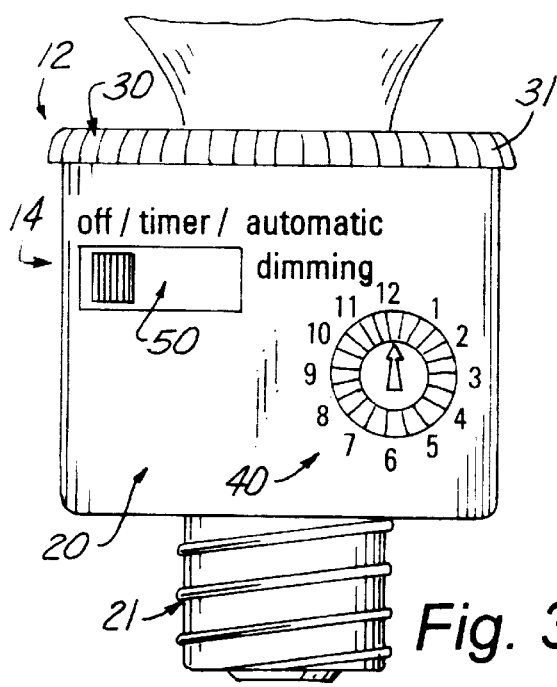
FIG. 3 is a side elevation view of the control switches that govern the operation of the gradual illumination device.

Turning now to FIGS. 2 and 3, it can be seen that the variable resistance unit 12 comprises in part a rheostat switch member 30 which is formed as a rotatable collar element 31 which surrounds the upper end of the female socket element 22 of the housing member 20.

In addition, the timer unit 13 comprises in part a programmable timer switch 40 disposed on the exterior surface of the housing member 20. The timer switch 40 is provided with conventional means for selecting a given time period for the actuation of the lighting system 10.

It should further be noted that while the timer switch 40 depicted in the drawings is a manual rotatable dial having a pointer arrow that will cooperate with printed indicia on the side of the housing member 20, a conventional digital timer switch (not shown) could be substituted therefor in keeping with the teachings of this invention.

Still referring to FIGS. 2 and 3, it can be seen that the control unit 14 comprises in general a three position slidable selector switch member 50 which is movable from an off position, a timer position and an automatic dimming position to control the operation of the lighting system 10.

Figure 4:
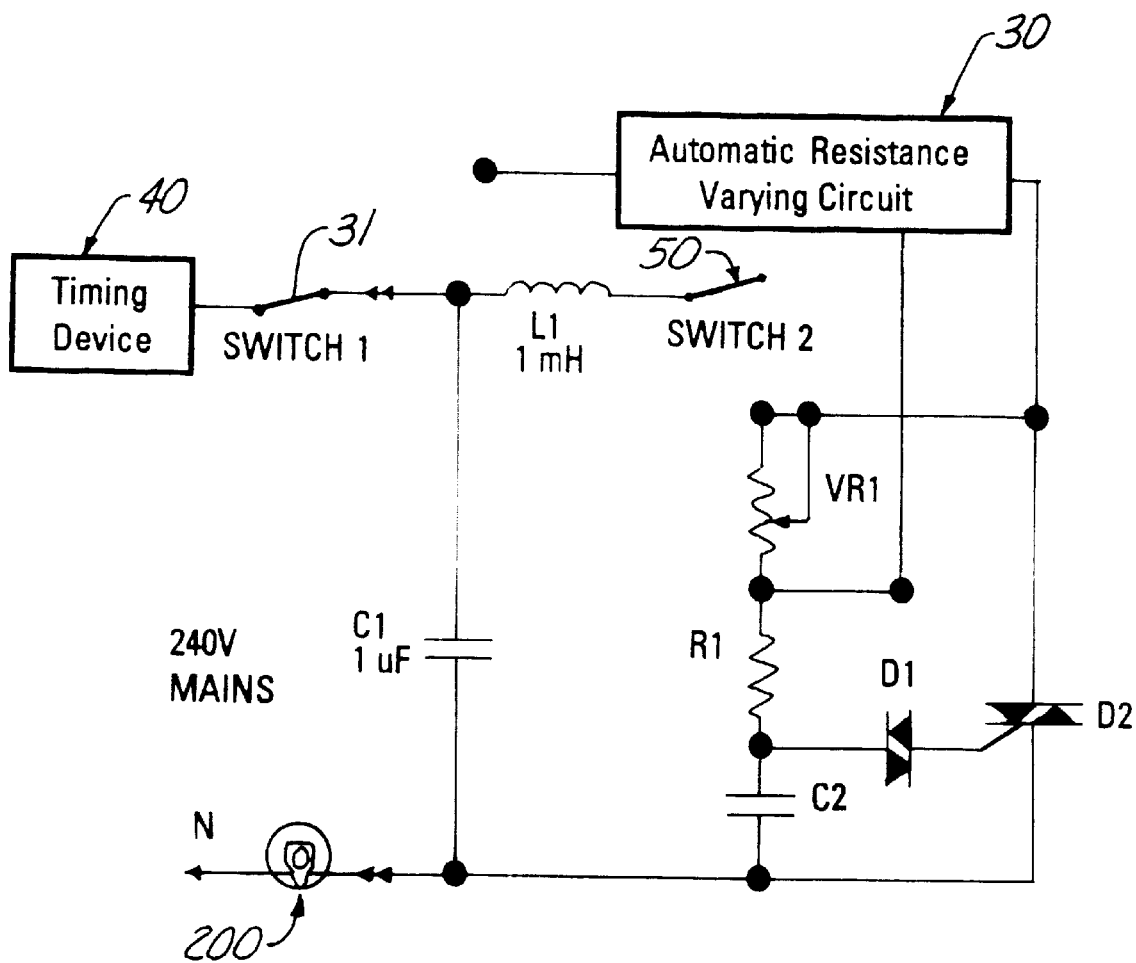
FIG. 4 is an electrical schematic diagram of the electrical circuitry and components of the illumination device.

Turning now to FIG. 4, it can be seen that the operator can employ the device 10 as either a sunrise simulator, a lamp dimmer, or burglar deterring device by switching between manual and auto dimming and turning the timer 40 on or off. When the dimmer 30 is set to manual, and the timer is turned on, the device 10 will turn the light on and off at the preset time thereby deterring potential burglars. When the dimmer 30 is set to automatic and the timer 40 is on then the timer 40 will turn on the lamp 200 at the preset time and the lamp 200 will slowly begin to illuminate simulating sunrise. Lastly, if dimming is set on manual, and time 40 is turned off, the user can use the device 10 as a lamp dimmer.

After the function of the device is determined, the power will be admitted through the timer 40 at the preset and current will flow through switch 1 and L1, and depending if the dimmer is set to manual or automatic, switch 2 will connect either VR1 or automatic resistance varying circuit to the circuit. If VR1 or automatic resistance varying circuit is low, C2 will charge quickly and D2 will trigger early in the cycle. If VR1 or automatic resistance varying circuit is high, C2 takes longer to charge and D2 will trigger for only a small part of the cycle. Depending on when D2 is triggered will determine the luminosity of the lamp 200. Lastly, C1 and L1 will prevent any voltage spikes and harmonics generated by the circuit from getting back into local main power supply and affecting nearby appliances. It should also be appreciated that the automatic resistance varying circuit comprises a circuit that changes the resistance similar to the function of VR1 except that it will automatically change the resistance over a period of time.

Furthermore, in order to obtain the simulated sunrise feature of this invention, it is contemplated that the light bulb 200 will be provided with a filter dome 80 having an orange or yellow tint so as to simulate the gradual illumination of the sun at daybreak to subtly interrupt the user's sleep patterns and cause the person to awake in a gentle and natural manner due to the gradual illumination provided by the lighting system.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A programmable gradual illumination device for use in combination with a conventional light fixture having a female socket and a conventional light bulb having a threaded male base end wherein the device comprises:

a housing unit including a generally cylindrical housing member having a lower externally threaded base element adapted to be received in the female socket of the conventional light fixture and having an upper internally threaded female socket element dimensioned to receive the threaded male base end of the conventional light bulb;

a timer unit associated with the housing unit and including a programmable timer switch;

a variable resistance unit including a manually operated rheostat switch member operatively connected to the housing unit and operatively associated with the programmable timer switch; and a control unit including a three position selector switch coupled to internal circuitry including an automatic resistance varying circuit disposed within the housing unit whereby the selector switch is movable from an off position to a timer position to an automatic dimming position to control the supply of electrical current from the light fixture to the light bulb.

2. The device as in claim 1 wherein when the selector switch is in the off position, the flow of electrical current from the light fixture to the light bulb will be controlled by the light fixture.

3. The device as in claim 2 wherein the flow of electrical current from the light fixture to the light bulb can be varied by the rheostat switch member.

4. The device as in claim 3 wherein when the selector switch is in the timer position, the flow of electrical current from the light fixture to the light bulb will be controlled in response to the setting of the programmable timer switch.

5. The device as in claim 4 wherein when the selector switch is in the automatic dimming position, the flow of the electrical current from the light fixture to the light bulb will be controlled both by the setting of the programmable timer switch and the setting of both the manually operated rheostat switch member and the automatic resistance varying circuit.

6. The device as in claim 5 wherein the manually operated rheostat switch member is rotatably disposed on the housing member.

7. The device as in claim 6 wherein the rheostat switch member is disposed in a surrounding relationship relative to the upper internally threaded female socket element on the housing member.

8. The device as in claim 1 further including:

a tinted filter dome dimensioned to fit over the conventional light bulb.

\* \* \* \* \*